Aug. 7, 1956
G. V. PECK
2,758,259
ELECTROLYTIC CAPACITOR DEVICE
Filed June 23, 1953
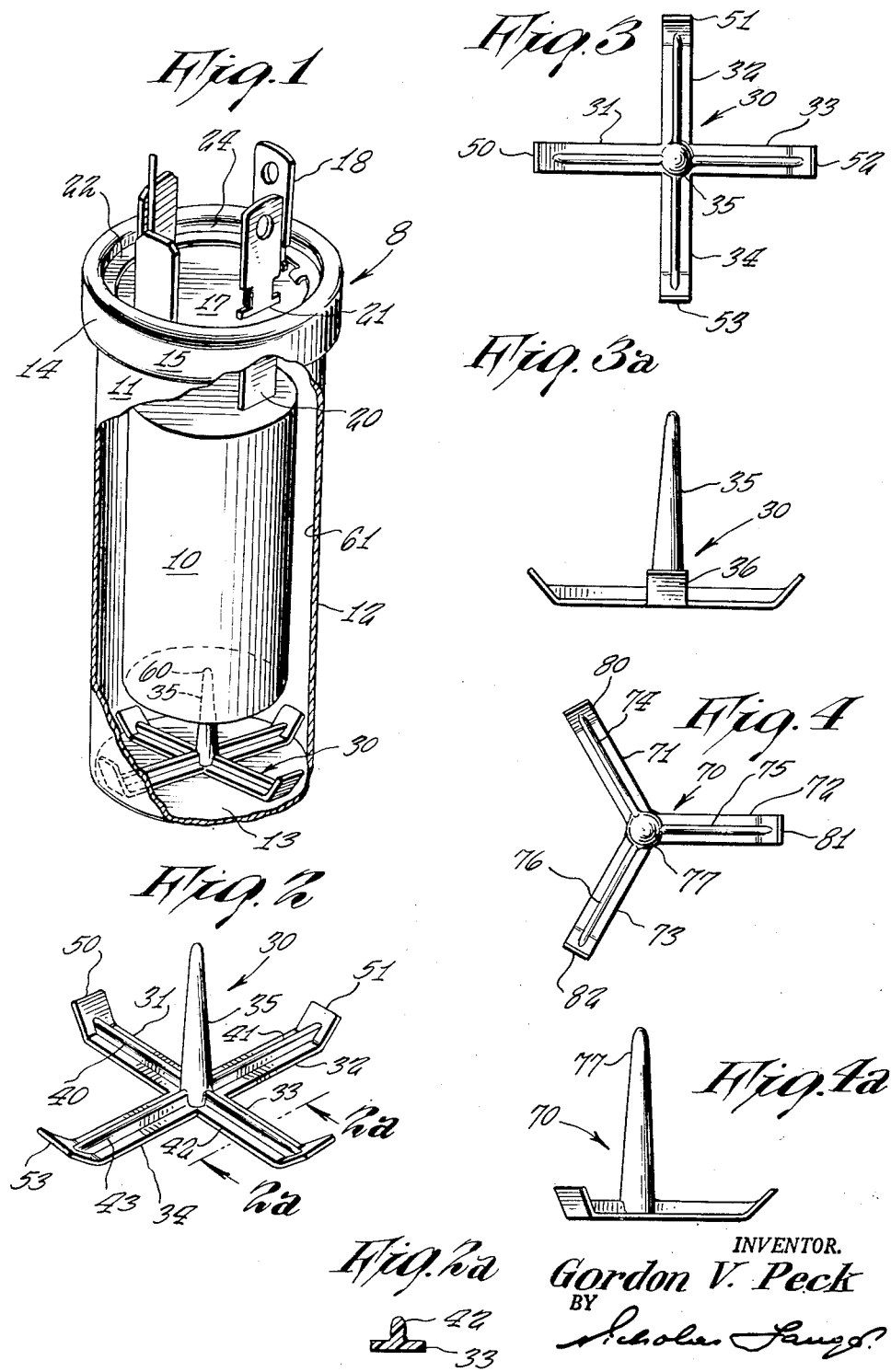
INVENTOR.
Gordon V. Peck
BY
Nicholas Longo
ATTORNEY United States Patent Office 2,758,259
Patented Aug. 7, 1956

2,758,259

ELECTROLYTIC CAPACITOR DEVICE

Gordon V. Peck, Indianapolis, Ind., assignor to P. R. Mallory & Co., Inc., Indianapolis, Ind., a corporation of Delaware Application June 23, 1953, Serial No. 363,556

6 Claims. (Cl. 317—230)

The present invention relates generally to electrolytic condensers and has specific pertinency to means and methods including such as to improve the construction of such electrolytic capacitors so as to anchor the capacitor cartridges in their containers in an improved and economical manner.

Heretofore, it has been common practice to anchor capacitor cartridges in their container by partially or completely filling a space between the cartridge and the container with wax or pitch. Further, in the case of electrolytic capacitors the practice has been to restrict, if possible, the wax level in said electrolytic capacitors so as to leave some gas expansion space near the terminal end of the unit.

In this type of mounting, there has been found to be several disadvantages. For example, it has been found that the pouring temperature of the compound is injurious to the capacitor since it causes the capacitor cartridge to lose some of the moisture constant of the electrolyte. This loss of moisture through vaporization in turn causes high power factor and high resistance tending to shorten the life of the unit. Again, the high temperature of the compound creates a shop hazard, both from fire due to overheated wax pots and personal injury to the operators. Further, the introduction of compound adds a source of impurities which can cause destructive corrosion and short life of the unit. Finally, it has been impossible to accurately control the final level of the filling compound. Frequent rejects, both in the factory and in the field, have been caused by insufficient compound permitting the unit to vibrate loose and break the terminal tabs. Over-pouring has caused the elimination of the gas expansion space, corrosion at the terminals and actual sealing of the gas expansion vent. Under certain conditions this can create an explosion hazard and frequently causes excessive leakage of electrolyte through the vent and around the tabs in the cover.

The present invention therefore completely eliminates the necessity of using pouring compound and obviates and eliminates the disadvantages stated above. It is therefore among the objects of the present invention to provide a supporting structure for the cartridge of an electrolytic capacitor which will obviate the need for partially or completely filling the space between the cartridge and its associated container with wax or pitch.

Another object of the present invention is to provide a supporting structure for a cartridge of an electrolytic capacitor which will locate the same centrally with respect to the container so as to maintain said cartridge in said position while providing means for eliminating the need for pouring wax or pitch within the container so as to support said cartridge therewithin.

Still another object of the present invention is to provide an improved capacitor support having among other features the advantages of effecting proper alignment of the cartridge within the container while eliminating the need for solidifying mediums to center the same, such as wax or pitch.

Another object of the present invention is to provide a new and improved supporting structure for a cartridge within an electrolytic capacitor which may be of one piece and has among other features the capacity for anchoring said cartridge centrally within its associated capacitor container whereby the need for pouring pitch or wax about said cartridge in said container is eliminated.

Still another object of the present invention is to provide a simple and economical means for centrally locating and maintaining a capacitor cartridge of an electrolytic capacitor within its associated capacitor container without providing any intermediate means containing pitch or wax.

The invention in another of its aspects relates to novel features of the instrumentalities described herein for teaching the principal object of the invention and to the novel principles employed in the instrumentalities whether or not these features and principles may be used in the said object or in the said field.

Other objects and the details of that which are considered to be novel in the present invention will become apparent from the following description and the claims appended thereto, taken in conjunction with the accompanying drawing and in which is shown an embodiment of the invention as incorporating the novel supporting structure of the cartridge employed in said capacitor.

In the drawing:

Figure 1 is a vertical cross-sectional view as particularly adapted to illustrate the supporting arrangement of the cartridge as being maintained within its associated container of the electrolytic capacitor, said cartridge adapted to be retained therewithin without inclusion of any surrounding wax or pitch;

Figure 2 is a pictorial representation of the pronged cross piece support of the present invention as adapted to centrally locate the capacitor cartridge within its associated container, said cross piece being resiliently mounted adjacent the side walls of its associated container so as to support and centrally locate said cartridge therewithin and eliminating the need for any pitch filling or wax embedding material thereabout;

Figure 2a is a cross-sectional view of the capacitor support shown in Figure 2 and as taken along line 2a—2a thereof;

Figures 3 and 3a are plan and horizontal cross-sectional views of the cross-piece support of the present invention illustrated in Figures 1 and 2 above; and Figures 4 and 4a are plan and horizontal cross-sectional views of a modified embodiment of the invention of a novel cross-piece support for the cartridge of an electrolytic capacitor.

Generally speaking, the present invention comprises a supporting structure which is adapted to locate a cartridge of an electrolytic capacitor centrally with respect to its container. The cartridge supporter, which may have a configuration of a cross-piece, includes a plurality of arms substantially disposed at approximately 90 to 120° with respect to each other and has at its midpoint, vertically extending upright therefrom, a tapered prong or protuberance which is adapted to fit snugly within the mandrel hole of the capacitor cartridge. The anchoring support fits at the bottom of the cartridge within the lower confines of the cartridge case so as to support the cartridge without the need of an embedded wax or pitch as heretofore used. In conjunction with the anode tabs, sufficient strength is thus provided to anchor the cartridge within the case.

Referring to the drawings, Fig. 1 shows an electrolytic capacitor 8 including a capacitor cartridge 10 contained within a metal cylindrical can 11 which comprises an annular side wall 12, a bottom end wall 13 and an open end 14. The open end is externally expanded to form an external bead section 15 within which is fitted a series of discs, for instance, a pair of insulative Bakelite discs such as 17 with a softer rubber disc sandwiched between them. Capacitor terminal lugs 18 are mounted in discs 17 and the capacitor electrodes within the can 11 are electrically connected to the respective terminal lugs 18 by means of tabs 20 which extend through slots 21 formed in the series of discs.

In order to mount the capacitor 8, a metal ring 22 of substantially the same diameter as the discs 17 is laid against the top surface of said top disc 17. The edge 24 of can 11 is then spun over the surface of the ring to firmly clasp the ring and discs together and seal the open end of the can. Ring 22 is provided with one or more integral lugs 27 bent up from the inner edge of the ring. These lugs provide means to mount the capacitor.

Thus, the capacitor cartridge is mounted within the can at its top end. However, it is necessary to provide an oppositely disposed supporting structure for the bottom end of the cartridge. It is further necessary that this same supporting structure locate the cartridge centrally with respect to the container and to maintain the same therewithin in a substantially fixed manner.

In Figs. 1-3 the bottom supporting means for centrally locating the capacitor cartridge is shown. The supporting structure as shown obviates the need for partially or completely filling the space between the cartridge and its associated container with wax or pitch. As shown in the figures, the cartridge cross-piece support 30 comprises a disc formed of a multiplicity of arms 31, 32, 33 and 34 separated from each other substantially at right angles. At the center from where the spaced arms radiate there is integrally formed a prong 35 configured as a tapered cone or tooth, whose function will be hereinafter described. The cross-piece support 30 may be fabricated of metal, such as aluminum, or of plastic, here shown as being preferably fabricated of a nylon, since the chance of tearing through the paper separator material and causing intermittent grounding is then eliminated.

Extending out from the base portion 36 of prong 35, and being buttressed thereby, are strengthening ribs 40—43. Ribs 40—43, as shown in Figs. 2 and 2a, substantially centrally extend longitudinally along each of the arms to be terminated at its outer point by means of angulated flanges 50—53.

In the assembly of the capacitor, as shown in Fig. 1, support 30 is fitted within casing 12 of the capacitor so as to snugly fit adjacent the bottom 13 thereof, with prong 35 being fitted into the mandrel hole 60 of the capacitor. Concurrently therewith each of the flanges are adapted to resiliently fit along the inside surface 61 of wall 12 so as to prop each of the arms thereagainst so as to buttress the same. Thus the capacitor cartridge is centrally located and firmly supported within the container. The necessity for utilizing wax or pitch to support the cartridge within the container is thus eliminated.

Capacitor assembly, container 12 and cross-piece support 30 may be formed as a unitary structure wherein by proper fabrication and moulding both the case and support could be supplied as one unit. Moreover, if desired, a second support may be used at the top of the capacitor to aid in further support of the capacitor cartridge.

In Figs. 4 and 4a the cross-piece support 70 is shown constructed as having an angular separator of substantially 120° between each of the individual arms 71, 72 and 73. In all other particulars the construction is the same as described above wherein strengthening ribs 74, 75 and 76 extend from prong 77 radially to be terminated by flanges 80, 81 and 82. Cross-piece support 70 may then be inserted within container 11 and adapted to support and centrally locate the capacitor cartridge 10 therewithin.

Thus the present invention has provided a novel support for anchoring capacitor cartridges within associated containers and eliminates the costly methods of using pitch or wax to fill the space between the cartridge and container. Moreover, the construction here above described greatly reduces work costs where a unit must be re-canned as well as eliminating the electricity and/or power costs attendant to heat and melt the wax or pitch used. Further, it has been found that the life of the unit has been lengthened through the reduction in loss of the electrolyte since by the present invention it keeps the average pressure within reasonable limits inside the unit.

While the present invention, as to its objects and advantages, has been described herein as carried out in specific embodiments thereof, it is not desired to be limited thereby, but it is intended to cover the invention broadly within the spirit and scope of the appended claims.

What is claimed is:

1. In an electrolytic capacitor including a case having open and bottom walls, a capacitor cartridge placed within said casing, said capacitor cartridge having a top and a bottom and a plurality of tabs, closure means for said capacitor case, a plurality of terminals connected to said tabs, said tabs penetrating said closure means, means comprising a plurality of discretely spaced arms, said arms having angulated flanges for centering said capacitor cartridge within said case, said means further supporting the same a determined distance from both the side and bottom walls of said case and allowing only atmosphere to circumscribe the same obviating the need for pitch or wax to support the cartridge within said case.

2. In an electrolytic capacitor including a case having open and bottom walls, a capacitor cartridge placed within said casing, said capacitor cartridge having a top and a bottom and a plurality of tabs, closure means for said capacitor case, a plurality of terminals connected to said tabs, annular means including circumferential and angulated flanges resiliently abutting the side wall of said case for centering said capacitor cartridge within said case, said means further including a central prong for supporting the same a determined distance from both the side and bottom walls of said case and allowing only atmosphere to circumscribe the same obviating the need for pitch or wax to support the cartridge within said case.

3. In an electrolytic capacitor including a case having open and bottom walls, a capacitor cartridge placed within said case, said capacitor cartridge having a top and a bottom, a plurality of tabs therefor, closure means for said capacitor case, a plurality of terminals connected to said tabs, means centering said capacitor cartridge within said case, said means including a plurality of spaced arms having strengthening ribs extending longitudinally therealong, said means further having a centrally located prong for supporting the cartridge a determined distance from both the side and bottom walls of said case and allowing only atmosphere to circumscribe the same obviating the need for pitch or wax to support the cartridge within said case.

4. In an electrolytic capacitor including a case having open and bottom walls, a capacitor cartridge placed within said case, said capacitor cartridge having a top and a bottom, a plurality of tabs therefor, closure means for said open wall of said capacitor case, a plurality of terminals connected to said tabs, a plurality of centrally radiating arms each separated from the other by at least ninety degrees, the center of which includes a vertically extending protuberance for penetrating said cartridge centering said capacitor cartridge within the case, said arms further supporting the same a determined distance from both the side and bottom walls of said case and allowing only atmosphere to circumscribe the same obviating the need for pitch or wax to support the cartridge within said case.

5. In an electrolytic capacitor including a case having open and bottom walls, a capacitor cartridge placed within said case, said capacitor cartridge having a top and a bottom, a plurality of tabs therefor, closure means for said open wall of said capacitor case, a plurality of terminals connected to said tabs, a plurality of centrally radiating arms each separated from the other by approximately one hundred and twenty degrees, the center of which includes a vertically extending protuberance for penetrating the bottom of said cartridge and whose individual arms have angulated flanges adapted snugly to abut the side annular wall of said case, said arms supporting the same a determined distance from both the side and bottom walls of said case and allowing only atmosphere to circumscribe the same obviating the need for pitch or wax to support the cartridge within said case.

6. In an electrolytic capacitor including a case having open and bottom walls, a capacitor cartridge placed within said case, said capacitor cartridge having a top and a bottom, a plurality of tabs, closure means for said open wall of said capacitor case, a plurality of terminals connected to said tabs, said tabs penetrating said closure means, a plurality of centrally radiating arm means for centering said capacitor cartridge within said case, said arms of said means being separated from each other and including a protuberance adapted to penetrate said cartridge substantially at the center thereof, the ends of each of said arms having flanges adapted to snugly fit the same along the annular side wall of said case, said means thus supporting the cartridge a determined distance from both the side and bottom walls of said case and allowing only atmosphere to circumscribe the same obviating the need for pitch or wax to support the cartridge within said case.

References Cited in the file of this patent

FOREIGN PATENTS

| | | |
|---|---|---|
| 63,482 | Denmark | May 14, 1945 |
| 374,581 | Great Britain | June 16, 1932 |